United States Patent [19]
Wallskog

[11] 3,813,904
[45] June 4, 1974

[54] LOCKING GAS CAP

[75] Inventor: Alan G. Wallskog, Prospect Heights, Ill.

[73] Assignee: E. Edelmann & Co., Skokie, Ill.

[22] Filed: Apr. 24, 1972

[21] Appl. No.: 246,773

[52] U.S. Cl.............................. 70/169, 220/24 GT
[51] Int. Cl.......................................... B65d 55/14
[58] Field of Search............ 70/163, 166, 167, 168, 70/169, 170, 171, 172, 173; 220/42 A, 42 C, 55 K, 55, 24 C, 24 GT, 44 R; 339/36

[56] References Cited
UNITED STATES PATENTS
| | | | |
|---|---|---|---|
| 1,879,359 | 9/1932 | Linfert et al. | 70/189 |
| 3,129,839 | 4/1964 | Grimsley | 220/42 A |
| 3,289,442 | 12/1966 | Berger et al. | 70/173 |
| 3,348,725 | 10/1967 | Fuller et al. | 220/42 A |

FOREIGN PATENTS OR APPLICATIONS
| | | | |
|---|---|---|---|
| 245,246 | 9/1962 | Australia | 220/44 R |

*Primary Examiner*—Albert G. Craig, Jr.
*Attorney, Agent, or Firm*—Lettvin and Gerstman

[57] ABSTRACT

A universal gas cap adapted to lock to gas tank filler necks of different sizes. The cap includes a cup-shaped member having a transverse wall and perimetral flange or skirt depending therefrom which is adapted to engage the outer surface of a large diameter filler neck. A central cylinder which carries latching tongues that are biased toward the skirt or flange is carried by the transverse wall and is concentrically located with respect to the skirt. The outer surface of the cylinder is adapted to engage the inner surface of a small diameter filler neck and the tongues are arranged to engage notches provided in the flange portion of either neck to secure the cap to the neck. Annular gasket means mounted to the cylinder sealingly engage the filler neck top.

3 Claims, 4 Drawing Figures

PATENTED JUN 4 1974          3,813,904
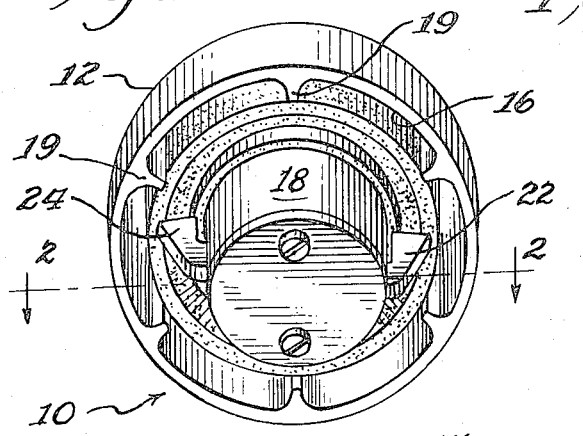
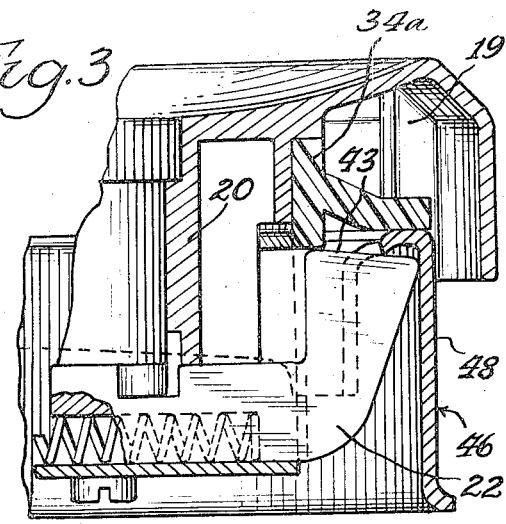
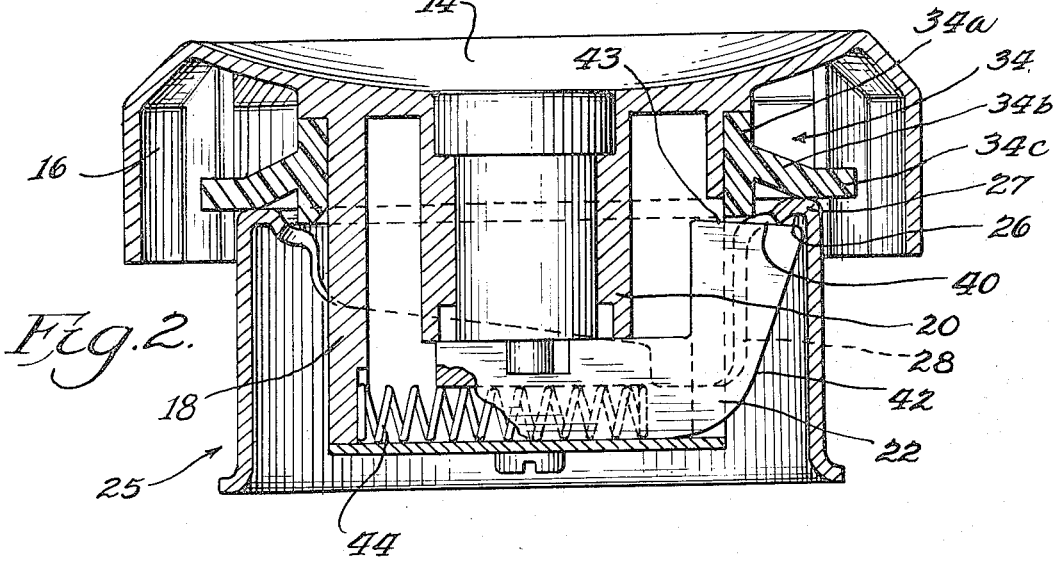
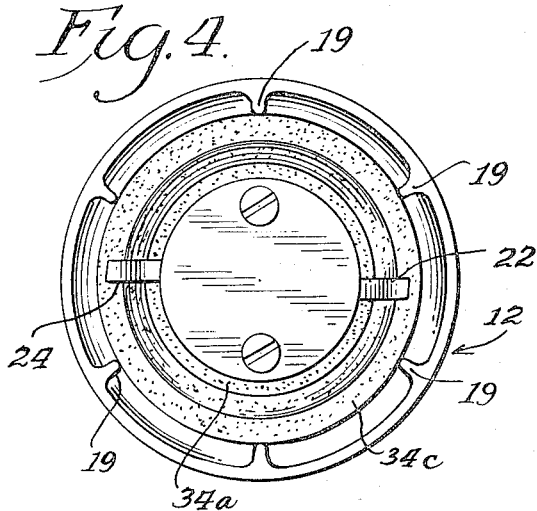

LOCKING GAS CAP

BACKGROUND OF THE INVENTION

This invention relates to locking gas caps and, more particularly, to a single gas cap that is constructed to cooperate with gas tank filler necks of different diameters.

Caps which lock to the gas tank filler necks of automotive vehicles are well-known in the art. Presently, there are two standard size filler necks, one neck having an inside diameter of approximately 1⅜ inches and the other larger neck an inside diameter of approximately 1½ inches. Prior art gas caps are constructed to lock to one or the other of the filler necks and thus two separate locking gas caps have been manufactured to accommodate the different size filler necks. In an effort to provide a multiple capacity, or universal cap, an arrangement for a gas cap has been provided in which the cap fits one neck by itself and in order to fit the other neck an attachment is provided which mounts to the cap and cooperates with the other size filler neck. This still requires the manufacture and provision of two separate pieces, that is, the cap and the attachment.

Therefore, it is an object of this invention to provide a universal construction which will fit and lock to both different size filler necks without an attachment.

Moreover, it is another object of this invention to provide a cap structure which is economical and readily manufactured for use with the different diameter gas tank filler necks.

SUMMARY OF THE INVENTION

By virtue of this invention, there is provided a universal locking gas cap adapted to lock to the two standard gas tank filler necks. The cap includes an outer guide member which is adapted to engage the outside surface of the large filler neck and an inner guide member adapted to engage the inside surface of a smaller filler neck. Therefore, this cap arrangement can accommodate a large filler neck which has a large outside diameter and a smaller filler neck which has a small inside diameter. Resilient annularly-shaped gasket means are mounted centrally on the cap between the inner and outer guide means and are arranged to sealingly engage the annular top surface of the gas cap filler neck. Locking means in the form of a pair of radially, outwardly biased tongues are provided which engage locking notches provided at the inside surface of each filler neck.

BRIEF DESCRIPTION OF THE DRAWINGS

FIG. 1 is a perspective view of the underside of the improved, universal size, locking gas cap of this invention, showing the inner guide means, outer guide means and locking means;

FIG. 2 is an enlarged cross-sectional view of the gas cap, taken substantially along line 2—2 of FIG. 1, and showing the cap in engagement with a filler neck having the small inside diameter;

FIG. 3 is a fragmentary enlarged cross-sectional view of the gas cap shown in FIG. 2, but showing the cap secured to the filler neck having the large inside diameter; and FIG. 4 is a bottom plan view of the cap shown in FIG. 1, showing a plurality of inwardly projecting radial fingers that act as an outer guide.

DESCRIPTION OF THE PREFERRED EMBODIMENT

Referring now to FIGS. 1 and 2, a gas cap 10 generally is shown. The cap includes a generally cup-shaped, die cast housing 12 having a concave transverse wall 14 and a perimetral flange or skirt 16. An integral annularly-shaped sleeve or central cylinder 18 which is concentric with the perimetral flange 16 projects away from the concave transverse wall 14. The sleeve 18 provides the inner guide, while a set of axially elongated inwardly projecting radial fingers or ribs 19, which are integral with the skirt 16 define an outer circle and form the outer guide. The sleeve 18 extends axially beyond the fingers 19. A lock cylinder sleeve 20 disposed within the inner sleeve 18 receives a lock cylinder assembly (not shown) which coacts with the lock tongues 22 and 24. The tongues are arranged to reciprocate in a substantially radial manner along a common diameter between the inner and outer guides and are arranged in circumferentially spaced relation to said fingers 19. The lock tongues 22 and 24, as shown in FIG. 1, can be retracted to a position completely within the sleeve 18 by a key in the well-known manner and are extended toward the outer guide by the action of a spring such as 44.

The small filler neck 25, is a tubular metal member having an inwardly rolled upper end 26. The rolled upper edge defines an inturned flange or top portion 27 which extends radially inwardly from the outer surface of the neck. The rolled edge also provides an inner axially extending return portion 28 which extends axially into the neck from the flange or top portion 27 and defines the inner surface and the inside diameter of the filler neck. The cap's sleeve 18 is dimensioned so as to slide into the inner surface or return portion 28 of the neck 25. This engagement of the sleeve 18 and the inner surface 28 of the filler neck provides radial alignment for the cap with respect to the filler neck. The outermost diameter of the filler neck 25 is sufficiently small that the outside surface does not engage the set of inwardly projecting guide fingers 19.

A resilient annularly-shaped gasket member 34 is positioned between the inner and outer guide and mounted to the cap by a tightly gripping fit onto sleeve 18. The gasket 34 includes a mounting sleeve 34a, a frusto-conical downwardly inclined skirt, or center portion 34b, and an annular horizontal outer flange 34c that is arranged to provide a radially projecting annularly-shaped flange-like surface which engages the top portion 27 of the filler neck 25. The engagement of the top portion 27 and the resilient gasket 34 provides the sealing engagement between the cap and the filler neck.

The inner return surface of the filler neck 25 is provided with a pair of substantially diametrically opposed notches, such as 40, for engagement by the outwardly radially biased lock tongues 22 and 24.

The tongues are provided with an axially tapering cam edge 42 to permit easy insertion of the cap into the filler neck and a latching edge such as 43 is provided across the top of the tongue 22. The edge 43 is positioned between the plane of the transverse wall 14 and the end of the guide ribs 19. In order to mount the cap to the small diameter filler neck 25, the cap is aligned with the neck so that the notches, such as 40, and the lock tongues 22 and 24 are in alignment, as well as the sleeve 18 and the inside surface 28 of the filler neck. The cap is then pushed onto the neck and as this occurs, the tongues are urged into a retracted position until the tongues pass the lowermost edge of the notch 40 at which point the springs urge the tongues outwardly below the lowermost edge of the notch so as to latch or secure the cap to the filler neck.

Removal of the cap from the filler neck is achieved by retracting the tongues 22 and 24 by means of a standard key action member which causes the tongues to retract a sufficient distance to permit disengagement of the tongues from the notches, such as 40.

Referring now to FIG. 3, a filler neck 46 which has an outside and an inside diameter larger than that of the filler neck 25 is shown. Here the outermost surface 48 of the filler neck 46 guides and slidably engages the inwardly projecting guide fingers or ribs 19 for positioning the cap on the filler neck. It is seen that the annularly-shaped resilient gasket 34 extends outwardly to the fingers 19 and thus is adapted to seal the large filler neck 46, as well as the small filler neck 25. Moreover, the lock tongues 22 and 24 extend further radially outwardly toward the ribs 19 than shown in FIG. 2 so as to lock to the larger filler neck 46. Thus, by the coaction of the outer guide members 19, the locking tongues 22 and 24 and the resilient gasket 34 effective securement and sealing of the cap 10 to the filler neck is achieved, as in the case of the small diameter filler neck 26. The inside surface 45 or inner diameter of the filler neck 46 is larger than the outside diameter of the sleeve 18, and thus the inside surface of the filler neck 46 and the sleeve 18 do not engage.

It will be appreciated that numerous changes and modifications can be made to the embodiment disclosed herein without departing from the spirit and scope of this invention.

What I claim and desire to secure by Letters Patent of the United States is:

1. A gas cap adapted for universal use with both large dimension and small dimension filler necks, said cap comprising, in combination: an inverted cup-shaped cap member of a maximum diametral dimension larger than the greatest diameter of the large dimension filler neck, said cup-shaped cap providing a downwardly extending perimetral flange and a transverse wall, a plurality of circumferentially-spaced and radially inwardly extending and axially elongated ribs on the perimetral flange terminating at their radially inner edges along the perimeter of an outer circle just slightly larger than the greatest diameter of the large dimension filler neck so as to provide an outer guide for telescopically receiving the end of a large dimension filler neck, a central cylinder extending downwardly from adjacent the transverse wall of the cup member to a point below the lowermost edge of the cylindrical perimetral flange and located concentric with said outer circle and having a maximum diameter just slightly less than the least diameter of the small dimension filler neck so as to provide an inner guide for telescopically entering the end of a small dimension filler neck a pair of substantially radially reciprocable latching tongues carried by the central cylinder with the adjacent sides of said tongues substantially at a diameter of the cylinder, the size of the latching tongues and range of movement thereof being selected so that when withdrawn within the central cylinder they do not interfere with telescoping movement of the central cylinder into a tubular filler neck and when projected outwardly they extend substantially to the perimeter of the outer circle, the positioning of the latching tongues on the central cylinder being such that the latch edges thereof lie in a plane located between the transverse wall of the cap and the distal axial ends of the ribs on the perimetral flange of the cap, and annular gasket means grippingly fitted onto the central cylinder and located axially in the space between the latch edges of the latching tongues and the transverse wall of the cap.

2. A gas cap adapted for universal use with both large dimension and small dimension filler necks, said cap comprising, in combination: an inverted cup-shaped cap member of a maximum diametral dimension larger than the greatest diameter of the large dimension filler neck, said cup-shaped cap providing a downwardly extending perimetral flange and a transverse wall, a plurality of circumferentially-spaced and radially inwardly extending and axially elongated ribs on the perimetral flange terminating at their radially inner edges along the perimeter of an outer circle just slightly larger than the greatest diameter of the large dimension filler neck so as to provide an outer guide for telescopically receiving the end of a large dimension filler neck, a central cylinder extending downwardly from adjacent the transverse wall of the cup member and located concentric with said outer circle and having a maximum diameter just slightly less than the least diameter of the small dimension filler neck so as to provide an inner guide for telescopically entering the end of a small dimension filler neck, the axial length of the central cylinder being greater than the axial length of said ribs, a pair of substantially radially reciprocable latching tongues carried by the central cylinder with the adjacent sides of said tongues substantially at a diameter of the cylinder, the size of the latching tongues and range of movement thereof being selected so that when withdrawn within the central cylinder they do not interfere with telescoping movement of the central cylinder into a tubular filler neck and when projected outwardly they extend substantially to the perimeter of the outer circle, the positioning of the latching tongues on the central cylinder being such that the latch edges thereof lie in a plane located between the transverse wall of the cap and the distal axial ends of the ribs on the perimetral flange of the cap, annular gasket means grippingly fitted onto the central cylinder and located axially in the space between the latch edges of the latching tongues and the transverse wall of the cap, and said latching tongues being circumferentially spaced from said elongated ribs.

3. A gas cap adapted for universal use with both large dimension and small dimension filler necks, said cap comprising, in combination: an inverted cup-shaped cap member of a maximum diametral dimension larger than the greatest diameter of the large dimension filler neck, said cup-shaped cap providing a downwardly extending perimetral flange and a transverse wall, a plurality of circumferentially-spaced and radially inwardly extending and axially elongated ribs on the perimetral flange terminating at their radially inner edges along the perimeter of an outer circle just slightly larger than the greatest diameter of the large dimension filler neck so as to provide an outer guide for telescopically receiving the end of a large dimension filler neck, a central cylinder extending downwardly from adjacent the transverse wall of the cup member and located concentric with said outer circle and having a maximum diameter just slightly less than the least diameter of the small dimension filler neck so as to provide an inner guide for telescopically entering the end of a small dimension filler neck, the axial length of the central cylinder being greater than the axial length of said ribs, a pair of substantially radially reciprocable latching tongues carried by the central cylinder with the adjacent sides of said tongues substantially at a diameter of the cylinder, the size of the latching tongues and range of movement thereof being selected so that when withdrawn within the central cylinder they do not interfere with telescoping movement of the central cylinder into a tubular filler neck and when projected outwardly they extend substantially to the perimeter of the outer circle, the positioning of the latching tongues on the central cylinder being such that the latch edges thereof lie in a plane located between the transverse wall of the cap and the distal axial ends of the ribs on the perimetral flange of the cap, annular gasket means grippingly fitted onto the central cylinder and located axially in the space between the latch edges of the latching tongues and the transverse wall of the cap, said annular gasket including an axially extending sleeve section which grippingly fits onto the central cylinder and a radially extending flange-like skirt extending from said sleeve to said outer circle, and said skirt comprising an intermediate frusto-conical section formed integral with said sleeve and a transverse annular outer section integral with the outer edge of said intermediate section.

* * * * *